(12) United States Patent
Sundaram et al.

(10) Patent No.: US 11,465,567 B2
(45) Date of Patent: Oct. 11, 2022

(54) VEHICLE REAR SEAT SECURED STORAGE SYSTEMS

(71) Applicants: Arjun Sundaram, Troy, MI (US); Coby S Clark, Troy, MI (US); Christopher J Pesta, Sterling Heights, MI (US); Gregory A Wasek, Shelby Township, MI (US); Khashayar Honarkhah, Bloomfield Hills, MI (US); Peter A Lawlis, Beverly Hills, MI (US); Sheila Alison Rahm, Auburn Hills, MI (US)

(72) Inventors: Arjun Sundaram, Troy, MI (US); Coby S Clark, Troy, MI (US); Christopher J Pesta, Sterling Heights, MI (US); Gregory A Wasek, Shelby Township, MI (US); Khashayar Honarkhah, Bloomfield Hills, MI (US); Peter A Lawlis, Beverly Hills, MI (US); Sheila Alison Rahm, Auburn Hills, MI (US)

(73) Assignee: FCA US LLC, Auburn Hills, MI (US)

(*) Notice: Subject to any disclaimer, the term of this patent is extended or adjusted under 35 U.S.C. 154(b) by 432 days.

(21) Appl. No.: 16/660,966

(22) Filed: Oct. 23, 2019

(65) Prior Publication Data

US 2020/0130591 A1 Apr. 30, 2020

Related U.S. Application Data

(60) Provisional application No. 62/749,880, filed on Oct. 24, 2018.

(51) Int. Cl.
*B60R 11/04* (2006.01)
*B60J 1/04* (2006.01)
(Continued)

(52) U.S. Cl.
CPC .................. *B60R 11/04* (2013.01); *B60J 1/04* (2013.01); *B60N 2/305* (2013.01); *B60N 2/3011* (2013.01);
(Continued)

(58) Field of Classification Search
CPC ...... B60R 11/04; B60R 7/043; B60R 11/0217; B60R 2011/0024; B60R 2011/0026;
(Continued)

(56) References Cited

U.S. PATENT DOCUMENTS 1,404,484 A * 1/1922 Schoonmaker ......... B60R 11/06
296/37.15
4,927,200 A * 5/1990 Wilkins .................. B60R 7/043
297/188.2
(Continued)

*Primary Examiner* — Pinel E Romain
(74) *Attorney, Agent, or Firm* — Ralph E. Smith

(57) ABSTRACT

A vehicle with a rear seat storage arrangement includes a floor, a seat including a seat bottom rotatably coupled to a seat back, and an underseat storage system removably coupled to the floor below the seat bottom. The underseat storage system includes a storage bin and a lockable lid defining a storage compartment. The lockable lid includes a latch configured to selectively lock to prevent access to the storage compartment and facilitate preventing access for removably uncoupling the underseat storage system from the floor.

17 Claims, 13 Drawing Sheets

(51) Int. Cl.

| | | |
|---|---|---|
| *G01S 13/86* | (2006.01) | |
| *H04N 5/225* | (2006.01) | |
| *B60R 7/04* | (2006.01) | |
| *E05B 83/28* | (2014.01) | |
| *E05C 9/04* | (2006.01) | |
| *B60N 2/30* | (2006.01) | |
| *B60R 11/02* | (2006.01) | |
| *H04R 5/02* | (2006.01) | |
| *B60R 11/00* | (2006.01) | |
| *G01S 13/931* | (2020.01) | |
| *B60Q 3/30* | (2017.01) | |
| *B60N 2/90* | (2018.01) | |
| *B60N 2/02* | (2006.01) | |

(52) U.S. Cl.
 CPC .......... *B60R 7/043* (2013.01); *B60R 11/0217* (2013.01); *E05B 83/28* (2013.01); *E05C 9/047* (2013.01); *G01S 13/867* (2013.01); *H04N 5/2252* (2013.01); *H04N 5/2253* (2013.01); *H04R 5/02* (2013.01); *B60N 2/02* (2013.01); *B60N 2/919* (2018.02); *B60Q 3/30* (2017.02); *B60R 2011/0024* (2013.01); *B60R 2011/0026* (2013.01); *E05Y 2900/538* (2013.01); *G01S 2013/93276* (2020.01); *H04R 2420/07* (2013.01); *H04R 2499/13* (2013.01)

(58) Field of Classification Search
 CPC .......... B60J 1/04; B60N 2/3011; B60N 2/305; B60N 2/02; B60N 2/919; E05B 83/28; E05C 9/047; G01S 13/867; G01S 2013/93276; H04N 5/2252; H04N 5/2253; H04R 5/02; H04R 2420/07; H04R 2499/13; B60Q 3/30; B60Q 3/225; E05Y 2900/538
 USPC .................................................... 296/37.15
 See application file for complete search history.

(56) References Cited

U.S. PATENT DOCUMENTS

| | | | | |
|---|---|---|---|---|
| 5,957,521 | A * | 9/1999 | Schlachter | B60R 7/043 297/188.09 |
| 6,547,300 | B2 * | 4/2003 | Watanabe | B62D 21/152 296/68.1 |
| 6,877,807 | B2 | 4/2005 | Mizuno et al. | |
| 7,300,088 | B1 | 11/2007 | Catenacci et al. | |
| 8,770,661 | B2 * | 7/2014 | Kalergis | B60N 2/305 297/188.1 |
| 9,016,778 | B2 * | 4/2015 | Hellman | B60N 2/68 297/188.1 |
| 9,421,915 | B2 * | 8/2016 | Kalergis | B60R 7/043 |
| 9,481,310 | B2 * | 11/2016 | Chawlk | B60R 7/043 |
| 9,776,573 | B2 | 10/2017 | Wiley | |
| 9,873,383 | B1 * | 1/2018 | Mather | B60R 7/043 |
| 10,086,766 | B2 | 10/2018 | Osterhoff et al. | |
| 10,137,841 | B1 * | 11/2018 | Neag | B60N 2/3047 |
| 10,336,262 | B2 | 7/2019 | Mozurkewich et al. | |
| 2002/0005649 | A1 * | 1/2002 | Hofmann | B60R 7/043 297/188.1 |
| 2004/0149791 | A1 * | 8/2004 | Tuel, Jr. | B60R 7/043 224/42.11 |
| 2006/0181103 | A1 | 8/2006 | Khan et al. | |
| 2010/0194133 | A1 | 8/2010 | Nakamura et al. | |
| 2011/0031775 | A1 * | 2/2011 | Clor | B60N 2/3079 296/66 |
| 2011/0241374 | A1 | 10/2011 | Graves | |
| 2013/0313869 | A1 | 11/2013 | Aguirre et al. | |
| 2014/0225403 | A1 * | 8/2014 | Shimada | B60N 2/06 297/188.1 |
| 2016/0121808 | A1 | 5/2016 | Bouillon | |
| 2017/0259748 | A1 | 9/2017 | Siy | |
| 2020/0023782 | A1 * | 1/2020 | Gill | B60R 7/043 |

* cited by examiner

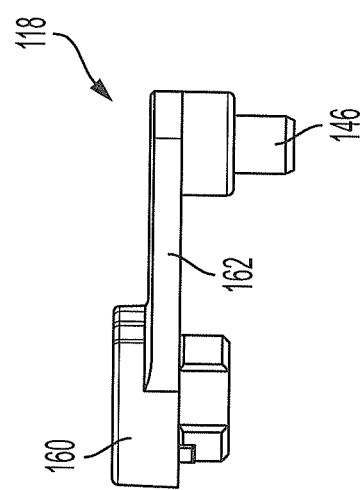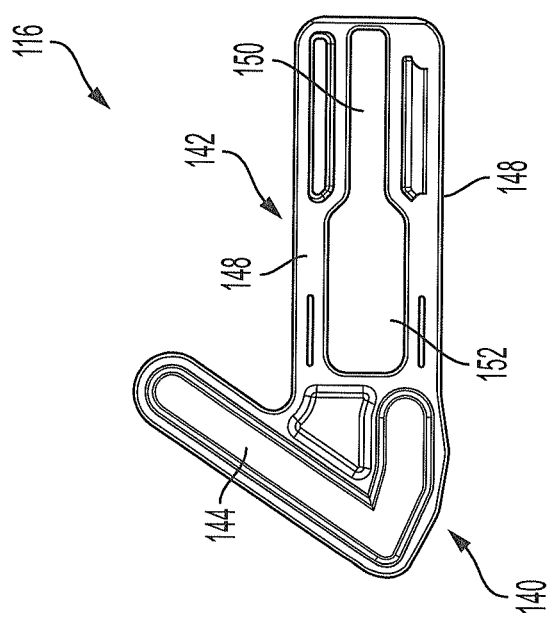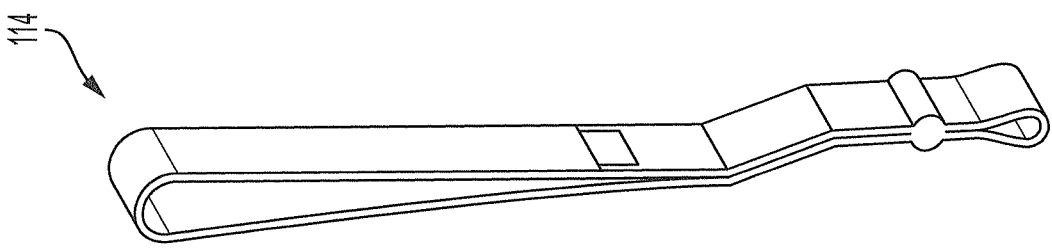

VEHICLE REAR SEAT SECURED STORAGE SYSTEMS

CROSS REFERENCE TO RELATED APPLICATIONS

This application claims the benefit of U.S. Provisional Application No. 62/749,880, filed Oct. 24, 2018, the contents of which are incorporated herein in their entirety by reference thereto.

FIELD

The present application relates generally to storage systems for vehicles and, more particularly, to a vehicle storage systems associated with a locking rear seat system of the vehicle.

BACKGROUND

Conventional passenger vehicles are typically limited in regard to secured interior storage options such as, for example, a vehicle glove box. Secured storage options are particularly desirable, for example, when a removable vehicle top is removed from the vehicle, thereby leaving a passenger compartment open and unsecured. Accordingly, there remains a desire for improvement in the relevant art.

SUMMARY

According to one example aspect of the disclosure, a vehicle with a rear seat storage arrangement is provided. In one example configuration, the vehicle includes a floor, a seat including a seat bottom rotatably coupled to a seat back, and an underseat storage system removably coupled to the floor below the seat bottom, the underseat storage system including a storage bin and a lockable lid defining a storage compartment. The lockable lid includes a latch configured to selectively lock to prevent access to the storage compartment and facilitate preventing access for removably uncoupling the underseat storage system from the floor.

In addition to the foregoing, the described vehicle may include one or more of the following features: wherein the underseat storage system is removably coupled to the vehicle floor such that the underseat storage system can be removed from the vehicle and utilized as a portable storage device; wherein the underseat storage system is removably coupled to the vehicle floor with a plurality of fasteners; and wherein the floor defines a footprint sized and shaped to receive and locate the underseat storage system within the vehicle such that a first plurality of apertures formed in a bottom of the storage bin substantially align with a second plurality of apertures formed in the floor, wherein the first and second plurality of apertures receive the plurality of fasteners.

In addition to the foregoing, the described vehicle may include one or more of the following features: a carrying handle coupled to the storage bin to facilitate carrying the portable underseat storage system when it is decoupled from the vehicle floor; wherein when the seat bottom is rotated upward into a storage access position, a user is able to open the lid to access the storage compartment, and wherein when the seat bottom is rotated downward into a seating position, the lid is prevented from being opened to thereby prevent access to the storage compartment; wherein the lockable lid latch is keyed to a key of the vehicle configured to unlock one or more doors of the vehicle and/or start an ignition of the vehicle; wherein the lockable lid latch comprises coupled pawls configured to move together; and wherein the pawls each include an arm having a distal end configured to be received within a latch receptacle formed in a front wall of the storage bin.

In addition to the foregoing, the described vehicle may include one or more of the following features: wherein the lid comprises a first lid and a second lid rotatably coupled to the storage bin; wherein the underseat storage system further comprises a plurality of locating tabs formed on an inner surface of the storage bin, the plurality of locating tabs configured to removably receive a divider therein such that a user can customize a number and size of smaller storage compartments defined within the storage bin; wherein the underseat storage system further comprises a split bridge removably received within recesses formed in front and rear walls of the storage bin, the split bridge configured to cover a space between the first and second lids; wherein the split bridge comprises a structural rib disposed between a pair of channels, the pair of channels angled and configured to direct liquid behind the storage bin and prevent liquid from entering the storage compartment; and wherein the vehicle seat is a 60/40 split seat, and the first and second lids are a 60/40 split corresponding to the 60/40 split seat.

According to another example aspect of the disclosure, a vehicle with a rear seat storage arrangement is provided. In one example configuration, the vehicle includes a floor, a rear wall, and a seat including a seat bottom rotatably coupled to a seat back. The seat back is selectively latchable to the rear wall and movable between a seating position where the seat back is latched to the rear wall, and a folded seat position where the seat back is rotated downward onto the seat bottom. A storage compartment is defined behind the seat back between the floor, the rear wall, and the seat back. A seat back locking system is integrated into the seat and movable from a locked position that prevents unlatching the seat back from the rear wall, and an unlocked position that enables unlatching of the seat back from the rear wall. In the locked position, the seat back locking system prevents unlatching of the seat back from the rear wall to thereby prevent access to the storage compartment.

In addition to the foregoing, the described vehicle may include one or more of the following features: wherein the seat back locking system includes a main housing, a pull strap housing, a pull strap, a lock slider, a lock arm, and a cable system; and wherein the storage compartment includes illuminating lights, one or more nets to provide additional storage space, and a cross-car bin.

According to another example aspect of the disclosure, a vehicle with a rear seat storage arrangement is provided. In one example configuration, the vehicle includes a floor, a rear wall, and a seat including a seat bottom rotatably coupled to a seat back, the seat back selectively latchable to the rear wall and movable between a seating position where the seat back is latched to the rear wall, and a folded seat position where the seat back is rotated downward onto the seat bottom. An underseat storage system is removably coupled to the floor below the seat bottom, the underseat storage system including a storage bin and a lockable lid defining a first storage compartment. The lockable lid includes a latch configured to selectively lock to prevent access to the first storage compartment and facilitate preventing access for removably uncoupling the underseat storage system from the floor. A second storage compartment is defined behind the seat back between the floor, the rear wall, and the seat back. A seat back locking system is integrated into the seat and movable from a locked position that prevents unlatching the seat back from the rear wall, and an unlocked position that enables unlatching of the seat back from the rear wall. In the locked position, the seat back locking system prevents unlatching of the seat back from the rear wall to thereby prevent access to the storage compartment.

In addition to the foregoing, the described vehicle may include one or more of the following features: in the locked position, the seat back locking system prevents rotation of the seat bottom from the seated position to the storage access position to facilitate preventing access to the first storage compartment.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 13 illustrates a perspective view of an example pull strap of the seat back locking system shown in FIG. 9, in accordance with the principles of the present disclosure;

FIG. 14 illustrates a top view of an example lock slider of the seat back locking system shown in FIG. 12, in accordance with the principles of the present disclosure; and FIG. 15 illustrates a side view of an example lock arm of the seat back locking system shown in FIG. 12, in accordance with the principles of the present disclosure.

DESCRIPTION

The present application is directed to a vehicle underseat storage system that is lockable and removably secured to the vehicle floor. In some configurations, the underseat storage system includes a plurality of lids and dividers for customizing the storage space. For example, if one of the lids is secured or locked, access to the secured area may be blocked from the other side due to the divider blocking the access opening. The underseat storage system is removable from the vehicle to provide a portable, securable storage system.

Additionally, the present application is directed to a seat back locking system for selectively securing a seat back to a rear vehicle wall. A storage compartment is defined between the seat and a rear wall of the vehicle and is configured to receive one or more objects. When in an upright, locked position, the seat back prevents access to the storage compartment. Once unlocked, the seat back can be rotated downward into a flat position, thereby providing access to the storage compartment.

Figure 1:
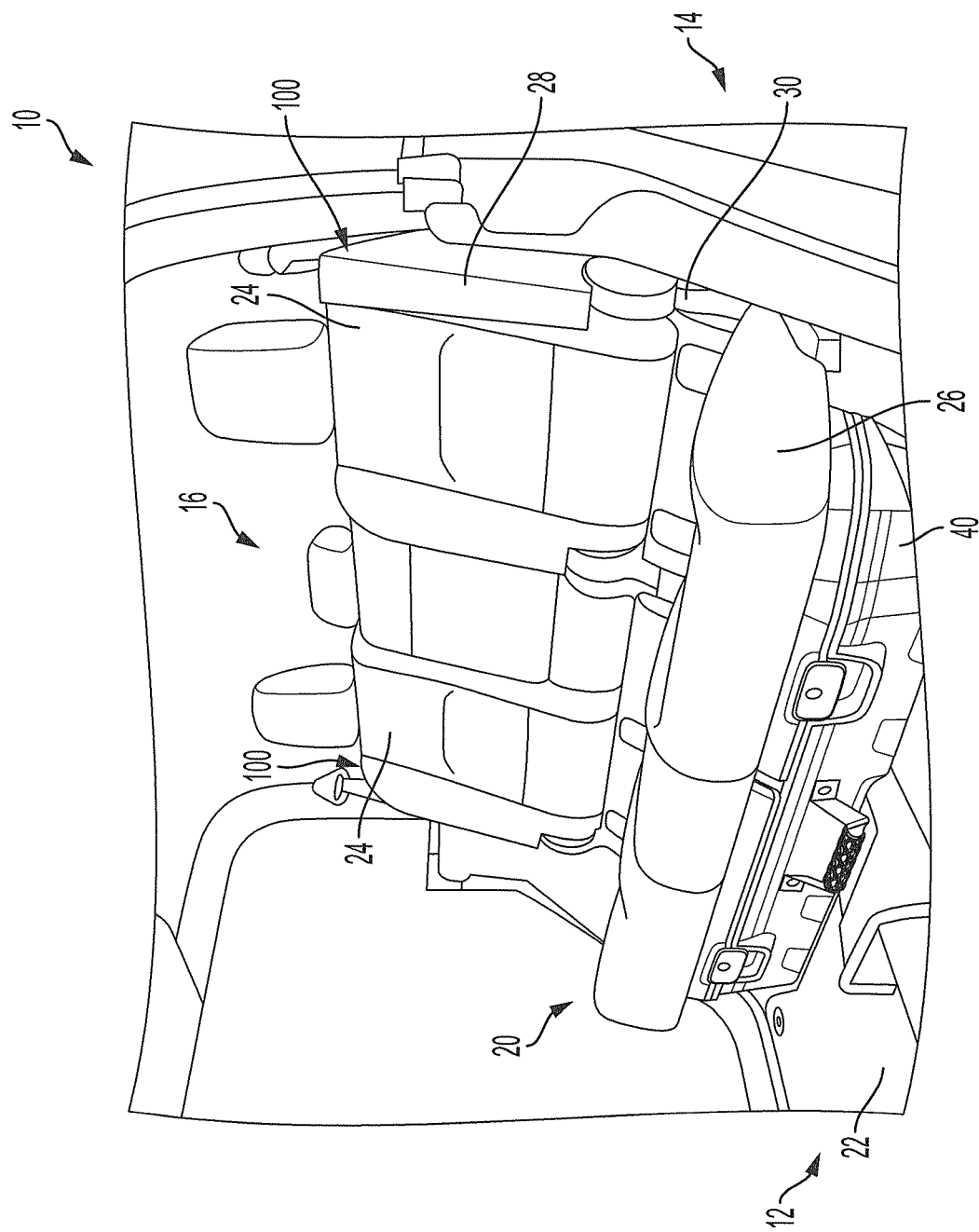
FIG. 1 is a perspective view of an example vehicle having an underseat storage system and seat back locking system, in accordance with the principles of the present disclosure.
Figure 2:
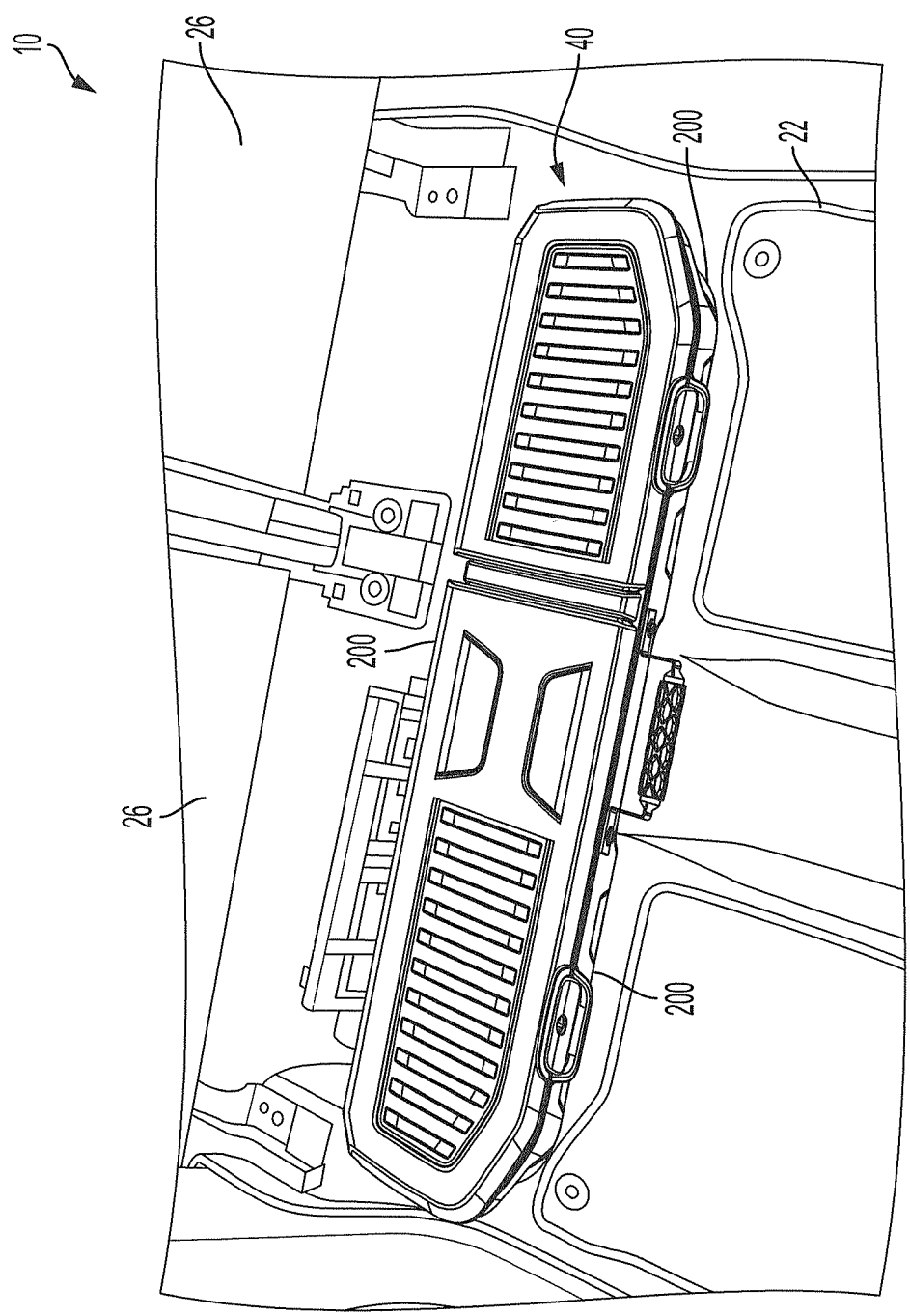
FIG. 2 is a top perspective view of the example underseat storage system secured to a vehicle floor with vehicle seating moved to an upright, stowed position, in accordance with the principles of the present disclosure.
Figure 3:
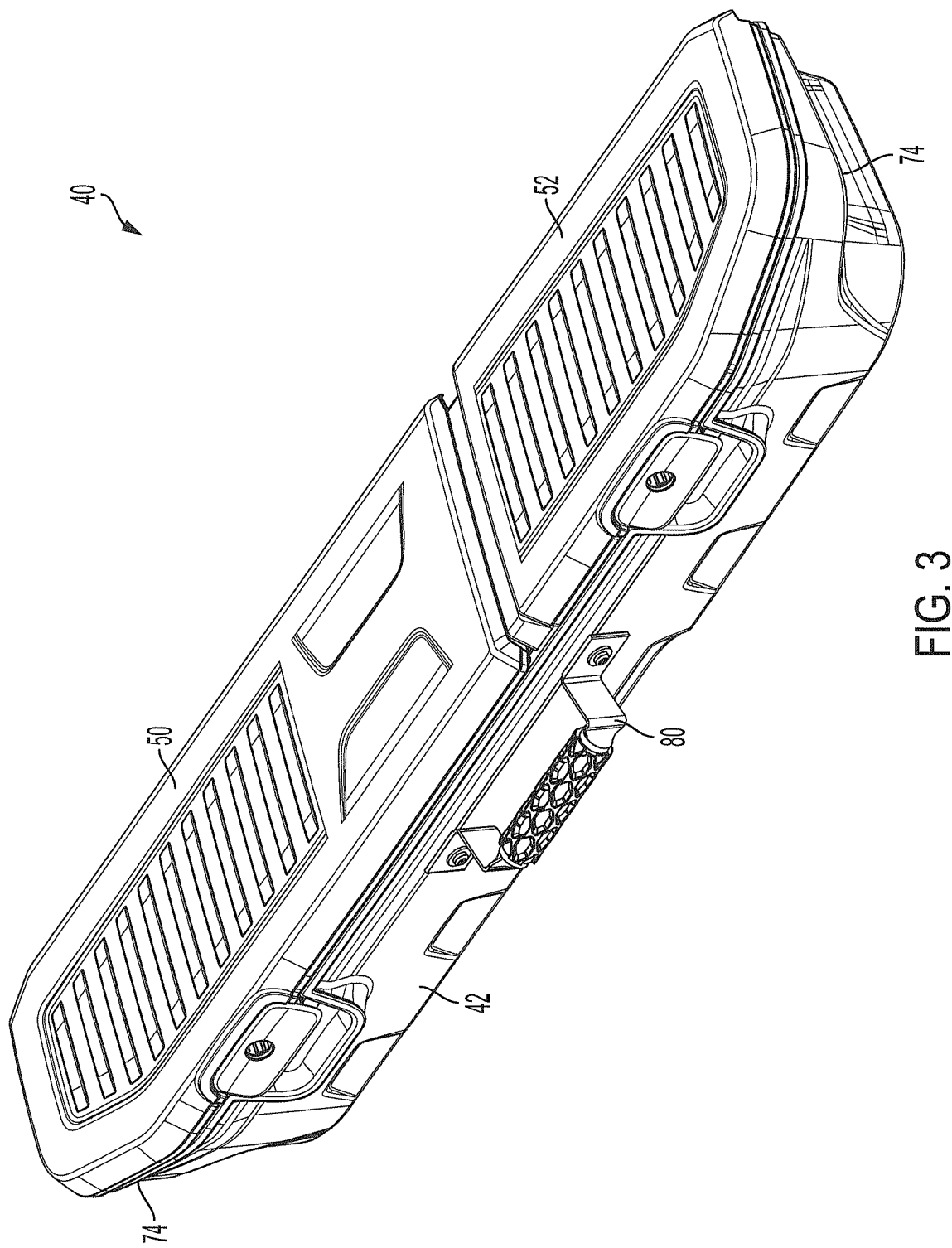
FIG. 3 is a perspective view of the example underseat storage system shown in FIG. 1, in accordance with the principles of the present disclosure.

Referring now to the drawings, FIG. 1 illustrates a vehicle 10 generally having a vehicle front 12, a vehicle rear 14, and an interior passenger compartment 16. In the example embodiment, the interior passenger compartment 16 generally includes front seating (not shown), rear seating 20, and a floor 22. The rear seating 20 includes one or more rear seats 24 having a seat bottom 26 rotatably coupled to a seat back 28. As such, the rear seats 24 are configured to rotate into various positions such as a seating position where seat back 28 is secured to a rear wall 30 of the vehicle (FIGS. 1, 8A), a folded seat position where the seat back 28 is folded forward onto the seat bottom 26 (FIG. 8B), and a storage access position where the seat bottom 26 is rotated upward and rearward toward the seat back 28 (FIG. 2). In the example embodiment, rotating the seat bottom 26 to the storage access position provides access to an underseat storage system 40. Additionally, a seat back locking system 100 is provided to enable secured access to a secured storage compartment 102 (see FIG. 8A) located behind seat 24 and at least partially defined by the cab rear wall 30.

Figure 4:
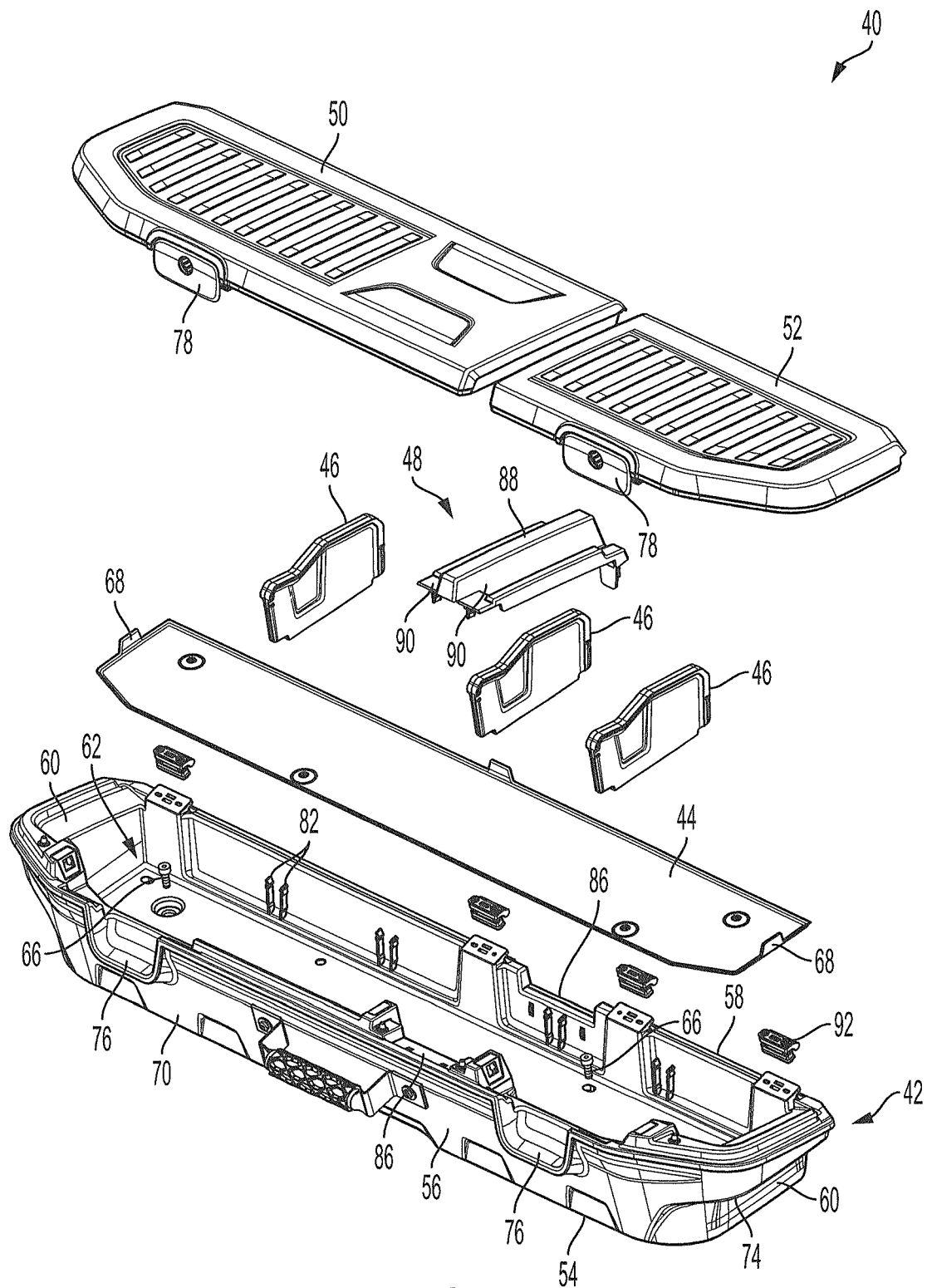
FIG. 4 is an exploded view of the underseat storage system shown in FIG. 3, in accordance with the principles of the present disclosure.

With further reference to FIGS. 2-7, the underseat storage system 40 will be described in more detail. With particular reference to FIG. 4, in the example embodiment, the underseat storage system 40 generally includes a storage bin 42, a liner 44, one or more removable dividers 46, a split bridge 48, a first lid 50, and a second lid 52.

In the illustrated example, the storage bin 42 is generally rectangular and includes a bottom wall 54, a front wall 56, a rear wall 58, and opposed side walls 60 generally defining a cargo area or compartment 62. The bottom wall 54 includes a plurality of apertures 64 configured to receive fasteners 66 (e.g., bolts) for removably coupling the storage bin 42 to the vehicle floor 22. In the example embodiment, the fasteners 66 are keyed for a special tool (not shown)

provided to the vehicle owner such that the special tool is required to remove the fasteners 66. The special tool may, for example, be utilized to remove other vehicle components such as doors, vehicle tops, or other selectively removable components. The liner 44 is configured to be disposed on the bottom wall 54 to provide a surface to receive cargo. In one example, the liner 44 includes tabs 68 to facilitate removing the liner 44. In some examples, the liner 44 is fabricated from rubber or other suitable material that is durable and easily cleaned.

As shown in FIG. 4, the front wall 56 includes an outer surface 70 and an inner surface 72. The side walls 60 each include a recess or hand hold 74 to enable a user to easily grip either side of storage bin 42, and outer surface 70 includes recesses 76 to enable a user's hand to access a rear side of lid latches 78, as described herein in more detail. A handle 80 is coupled to the outer surface 70 and facilitates insertion or removal of the underseat storage system 40 into or out of the vehicle 10 and enables a user to carry storage system 40, for example, like a suitcase.

Figure 7:
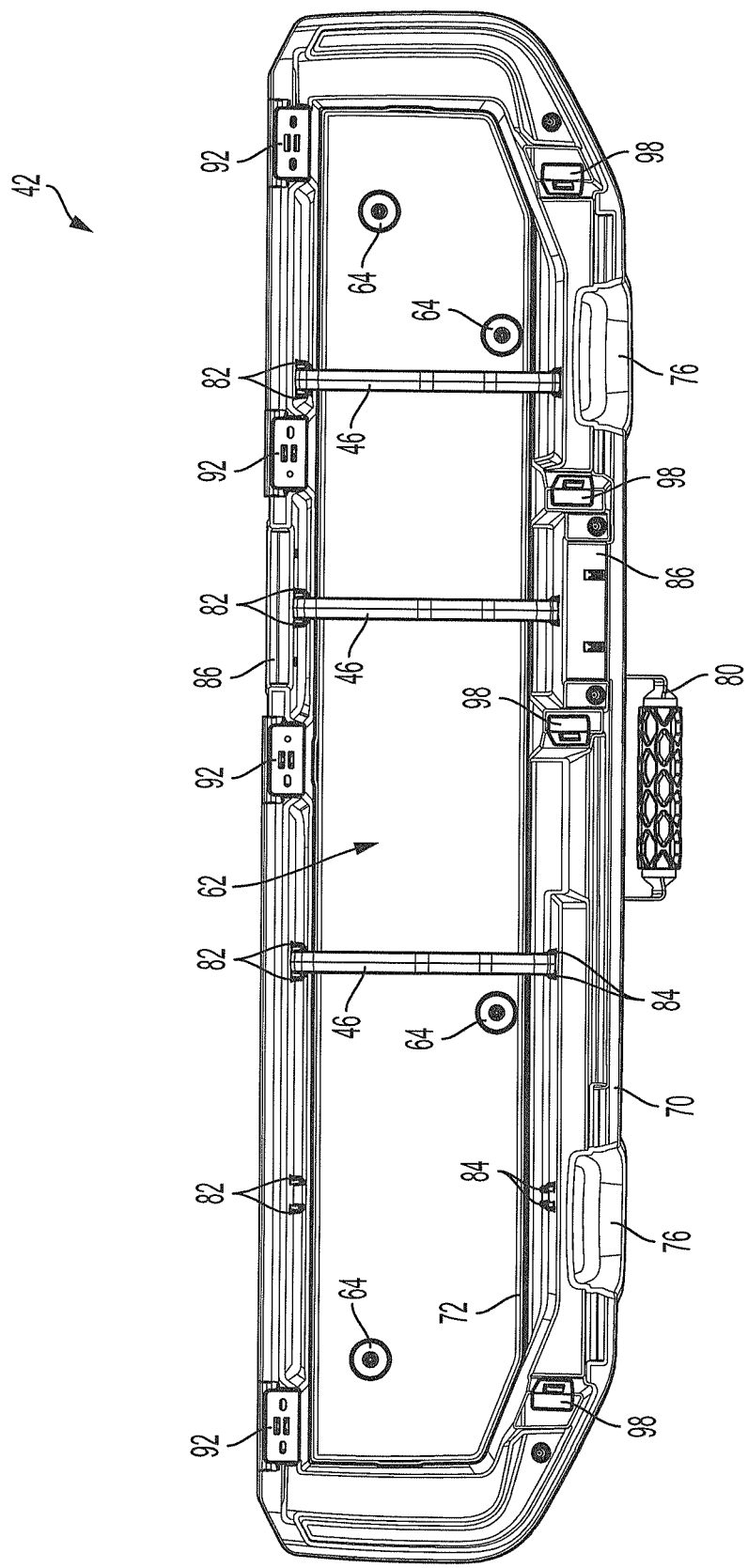
FIG. 7 is a top view of the underseat storage system shown in FIG. 3 with a lid removed, in accordance with the principles of the present disclosure.

In the example embodiment, rear wall 58 includes a plurality of locating tabs 82, and the front wall inner surface 72 includes corresponding locating tabs 84 (FIG. 7). Each pair of corresponding locating tabs 82, 84 is configured to receive one of the dividers 46. As such, a rearward end of divider 46 is inserted between locating tabs 82, and a forward end of divider 46 is inserted between locating tabs 84, to thereby divide the compartment 62 into desired sections, for example, as shown in FIG. 7. In the illustrated example, the compartment 62 is divided into four sections by three dividers 46. However, it will be appreciated that system 40 can have any suitable number of locating tabs 82, 84 and dividers 46 to divide the compartment 62 into a desired number of sections.

Figure 6:
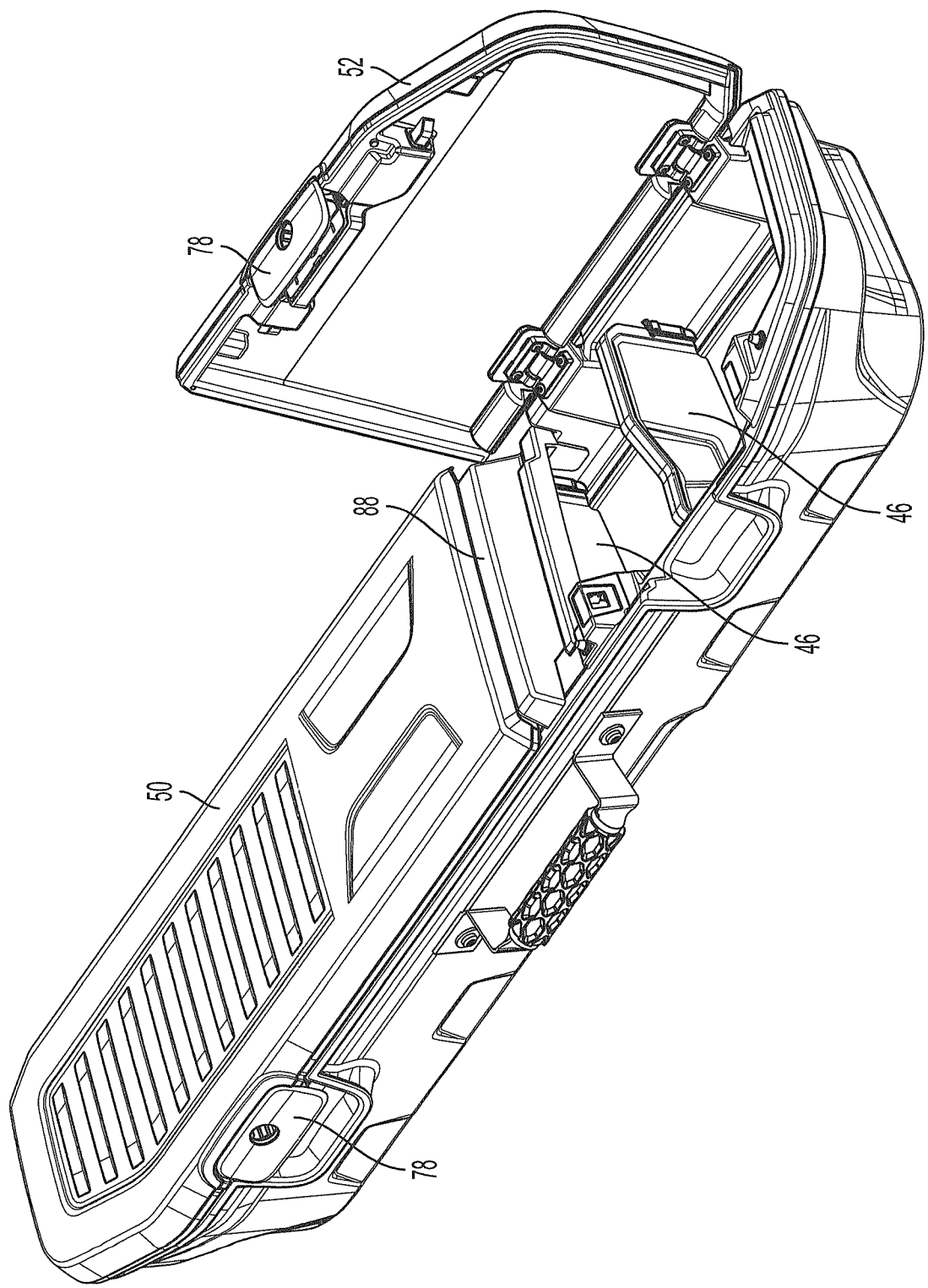
FIG. 6 is a perspective view of the underseat storage system shown in FIG. 3 in one open position, in accordance with the principles of the present disclosure.

With additional reference to FIGS. 4 and 6, in the example embodiment, the split bridge 48 is configured to be removably received within recesses 86 formed in the front and rear walls 56, 58. In one example, the recesses 86 are located so as to split the storage system into a 60/40 split corresponding to 60/40 seats disposed thereover. However, it will be appreciated that other splits are contemplated such as, for example, a 50/50 split. In the illustrated example, split bridge 48 includes a structural rib 88 disposed between a pair of channels 90, which are angled and configured to direct liquid behind the storage bin 42 in the event of a spill to prevent liquid from entering the compartment 62. Moreover, the split bridge 48 is configured to be disposed over one divider 46 extending between the recesses 86 such that access between adjacent sections is prevented if only one of the lids 50, 52 is open, for example, as shown in FIG. 6.

In the example embodiment, the first and second lids 50, 52 are rotatably coupled to the rear wall 58 by one or more hinges 92. In one example, hinges 92 are friction hinges configured to hold lid 50, 52 at any position between closed and fully open positions. In the illustrated example, first and second lids 50, 52 are sized for a 60/40 split corresponding to the seating disposed thereabove. In this way, the 60-seat bottom 26 can be independently rotated upward to access the first lid 50 (e.g., a 60-lid) and thus the portion of the compartment 62 accessible thereto. Similarly, the 40-seat bottom 26 can be independently rotated upward to access the second lid 52 (e.g., a 40-lid) and thus the portion of the compartment 62 accessible thereto. However, it will be appreciated that lids 50, 52 may have any suitable size or split. Moreover, system 40 could include any suitable number of lids such as, for example, a single lid or three lids. It will be appreciated that in a design with more than two lids, system 40 may include a plurality of split bridges 48 and associated recesses 86.

Figure 5:
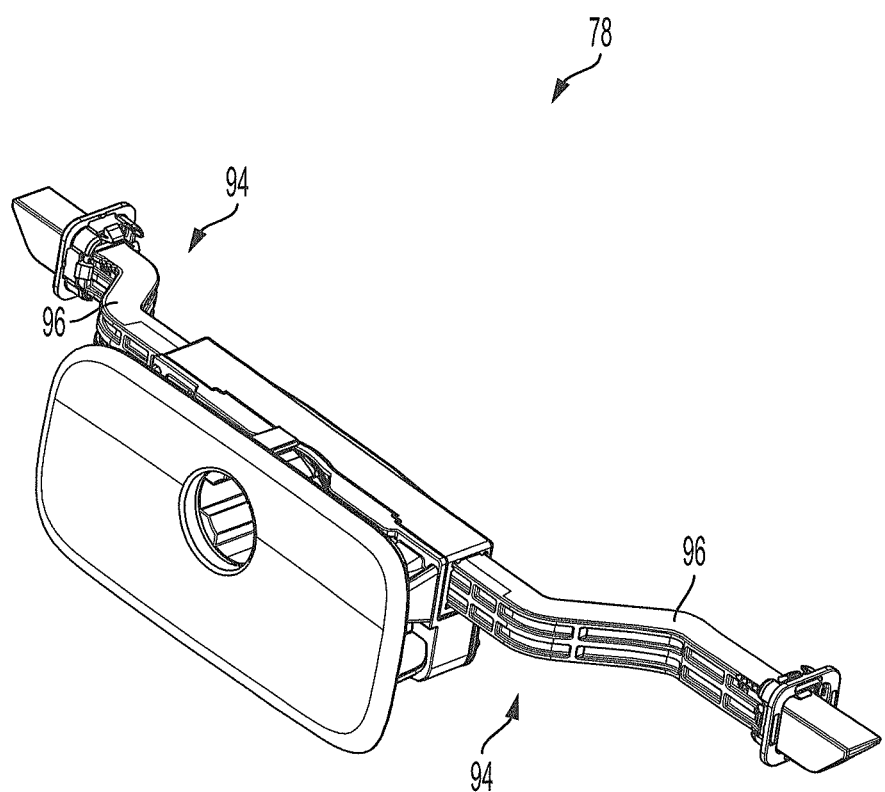
FIG. 5 is a perspective view of an example locking latch of the underseat storage system shown in FIG. 3, in accordance with the principles of the present disclosure.

In the example embodiment, each lid 50, 52 includes one lockable lid latch 78 to lockably secure lids 50, 52 to the storage bin 42. As shown in FIG. 5, lockable lid latch 78 can include coupled pawls 94 configured to move together when closing the lids 50, 52. The pawls 94 each include arms 96 having distal ends configured to be received within latch receptacles 98 formed in front wall 56 (see FIG. 7). In the closed position, the distal ends are received within receptacles 98 and prevent opening of the lid 50, 52. When lockable lid latch 78 is unlocked and latch handle 78 is pulled, the pawl arms 96 are drawn towards each other and distal ends are withdrawn from receptacles 98, thereby enabling opening of the associated lid 50, 52. In one example, when closing the associated lid 50, 52, the arms 96 travel inward/outward equally in unison. Moreover, the locking latches 78 can be advantageously keyed to the vehicle keys such that latches 78 do not require a separate key.

In the example implementation, the underseat storage system 40 is installed by rotating seat bottoms 26 upward into the storage access position (FIG. 2). Storage bin 42 is then located within a locating footprint or receiving cavity 200 formed in the vehicle floor 22 and/or surrounding vehicle structure that is sized and shaped to receive and orient the storage bin 42 therein. In this position, the plurality of apertures 64 formed in the bottom wall 54 are aligned or substantially aligned with corresponding receiving apertures (not shown) formed in the vehicle floor 22. The lids 50, 52 are then opened to provide access to the apertures 64 (after removing liner 44), and the fasteners 66 are subsequently inserted into apertures 64 and the receiving apertures using the special tool to thereby secure the underseat storage system 40 to the vehicle floor 22. The liner 44 is then replaced, the lids 50, 52 are closed, and the seat bottoms 26 are subsequently rotated downward into the seated position, for example, as shown in FIG. 1.

Figure 8B:
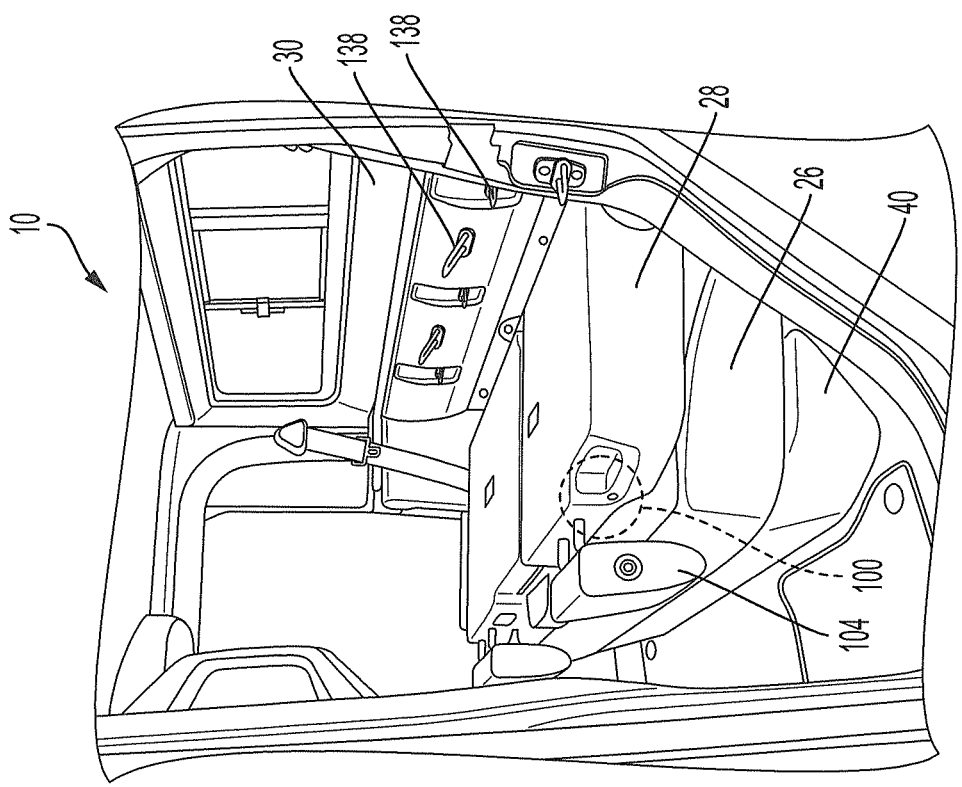
FIG. 8B is a perspective view of the seat back locking system shown in FIG. 1 with vehicle seats in a folded seat position, in accordance with the principles of the present disclosure.
Figure 8A:
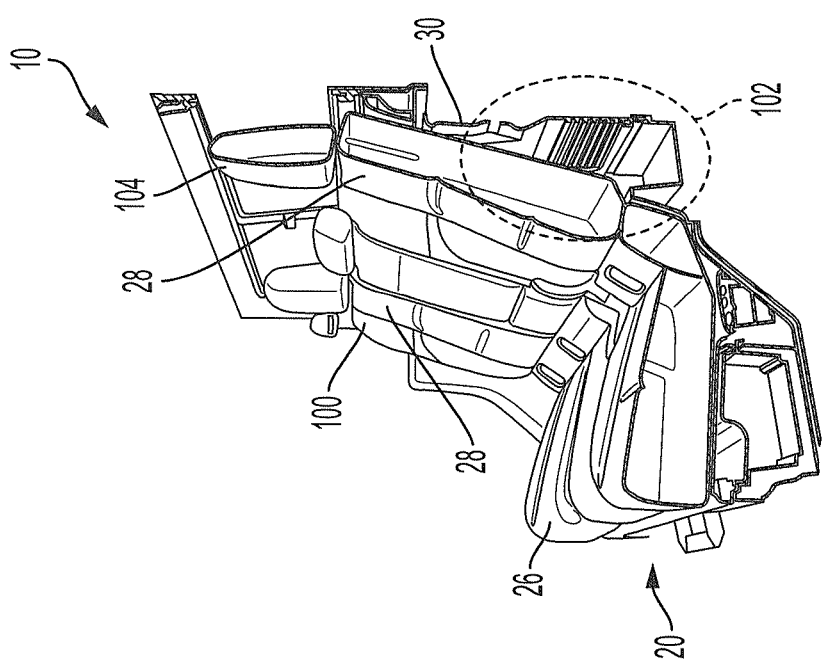
FIG. 8A is a sectioned perspective view of the seat back locking system shown in FIG. 1 with vehicle seats in a deployed seating position, in accordance with the principles of the present disclosure.

With reference now to FIGS. 8A-15, the seat back locking system 100 will be described in more detail. As shown in FIGS. 8A and 8B, seat back 28 is rotatable between the seating position (FIG. 8A) and the folded seat position (FIG. 8B). In the seating position, the seat back 28 is latched to the cab rear wall 30 and the seat 24 defines storage compartment 102 between the seat 24 and rear wall 30 for cargo or other objects. In some examples, the storage compartment 102 includes lights (not shown) on quarter trim panels to illuminate the storage compartment 102, one or more nets 106 (FIG. 8) on the rear wall 30 to provide additional storage space, and/or a cross-car bin 108 that extends at least a portion of the cross-car width of the compartment 102 for receiving objects. The seat back locking system 100 enables the latched seat back 28 to be selectively locked, thereby providing a secured storage compartment 102, for example, when a removable roof (e.g., soft top, hard top) is removed from the vehicle and the vehicle passenger compartment 16 is otherwise unsecured.

Figure 9:
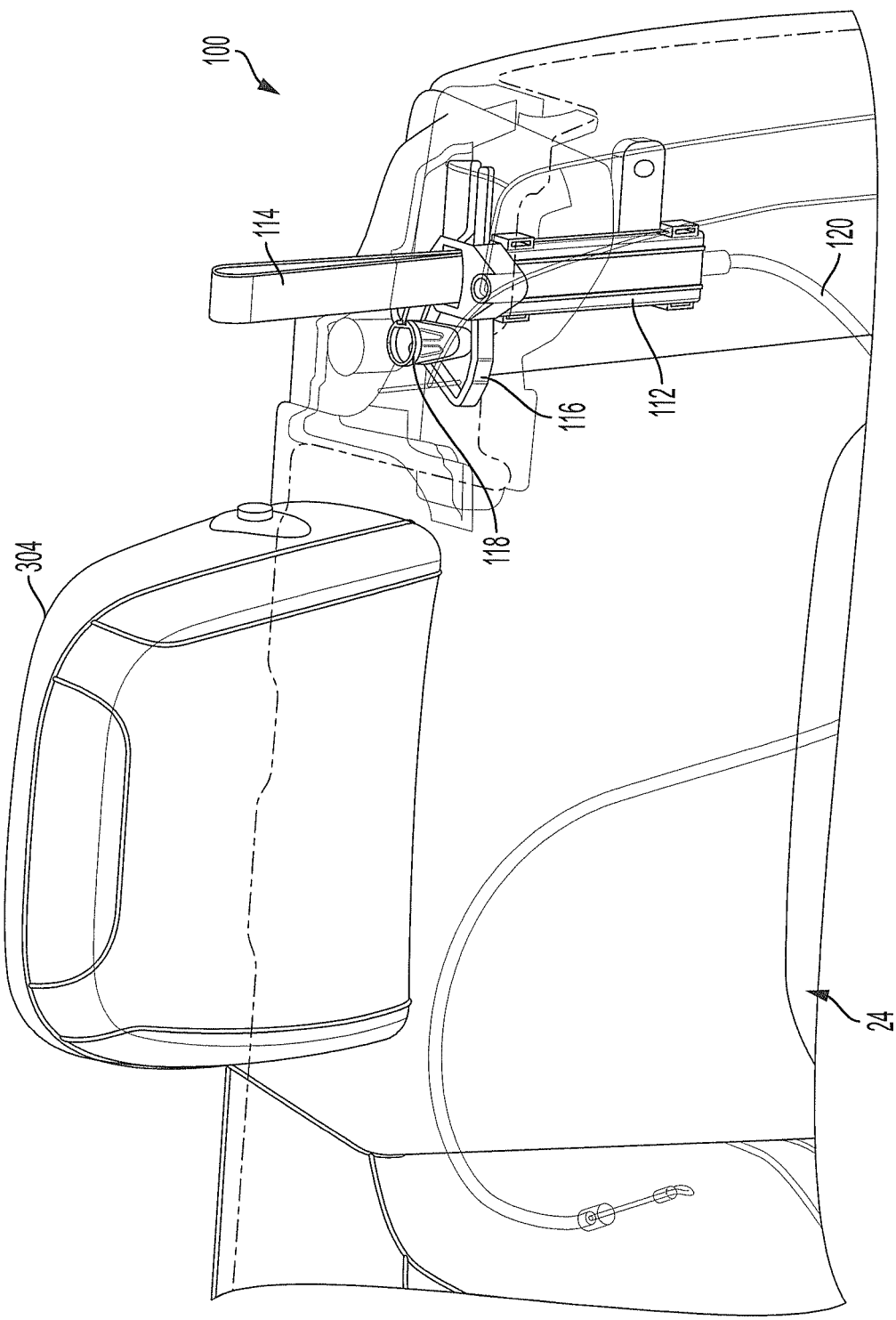
FIG. 9 is a perspective view of the seat back locking system of FIG. 8A positioned within an example vehicle seat shown in phantom, in accordance with the principles of the present disclosure.

As shown in FIGS. 8B and 9, in the example embodiment, the seat back locking system 100 is disposed in an upper quadrant of seat 24 adjacent a headrest 104 (e.g., near a passenger shoulder). However, it will be appreciated that seat back locking system 100 may be disposed in any other location in/on seat 24 that enables system 100 to function as described herein. For example, seat back locking system 100 may be disposed in seat bottom 26.

In the illustrated embodiment, shown in FIGS. 9-15, the seat back locking system 100 generally includes a main housing 110, a pull strap housing 112, a pull strap 114, a lock slider 116, a lock arm 118, and a cable system 120.

Figure 10:
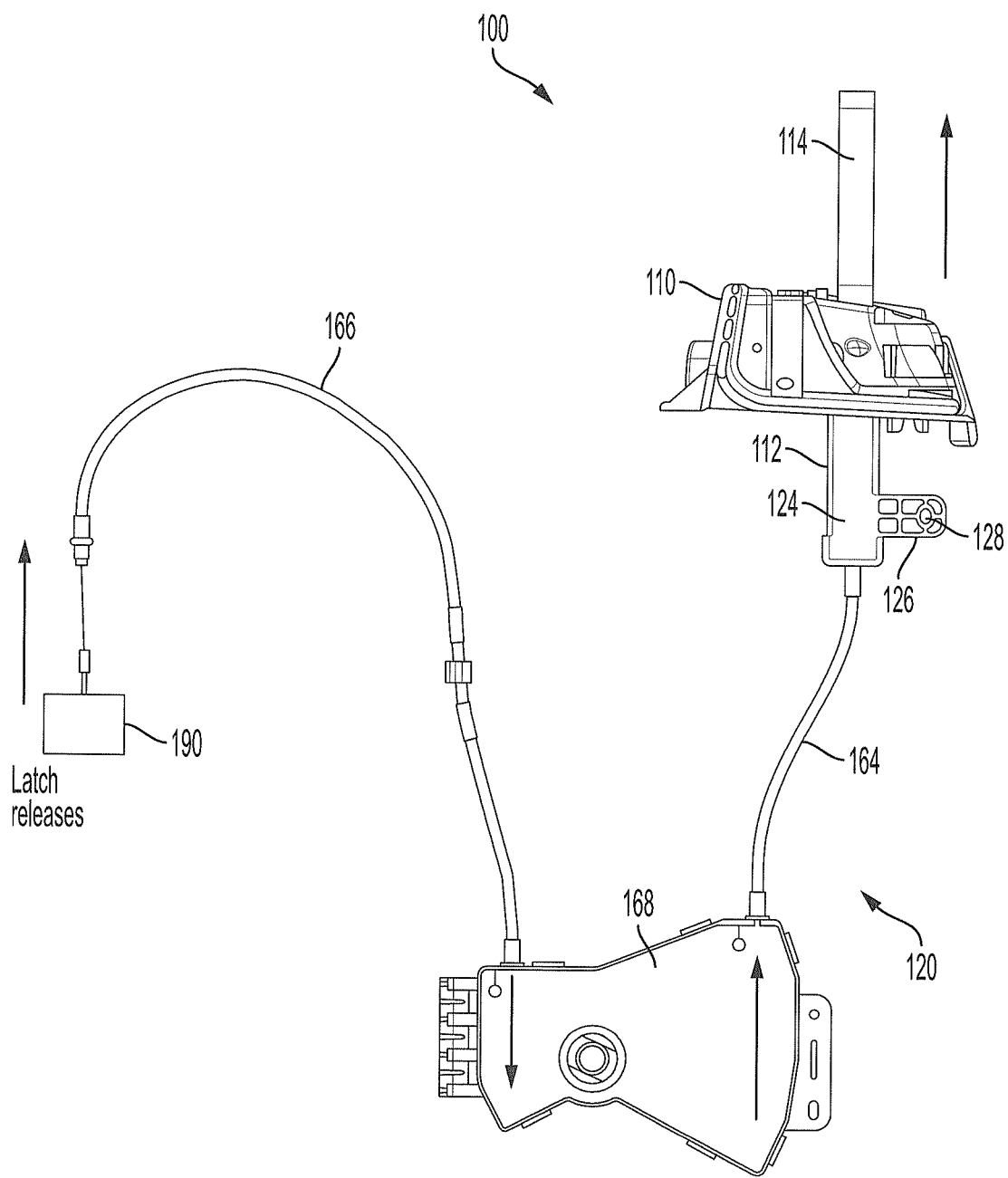
FIG. 10 is a side view of the seat back locking system of FIG. 9, in accordance with the principles of the present disclosure.

With continued reference to FIGS. 9 and 10, in the example embodiment, the main housing 110 is secured to the interior structure (not shown) of seat 24 and at least partially houses the pull strap housing 112, pull strap 114, lock slider 116, and lock arm 118. The pull strap housing 112 includes a body 124 to at least partially house the pull strap 114 and to provide a solid attachment for a portion of the cable system 120. A tab 126 extends from the body 124 and includes an aperture 128 to receive a fastener (not shown) to couple the pull strap housing 112 to the seat 24.

With additional reference to FIG. 13, the pull strap 114 includes a first end 130, an opposite second end 132, a locking barrel 134, and an indicator marking 136. The strap first end 130 is disposed within pull strap housing 112 and is configured to couple to the cable system 120. The strap second end 132 extends out of the housings 110, 112 and the seat 24 (see FIG. 9) and is located for a user to selectively pull the pull strap 114, which unlatches the seat back 28 from latch strikers 138 (FIG. 8B) on the cab rear wall 30. The locking barrel 134 is operably associated with the lock slider 116 to selectively prevent movement of the pull strap 114 and thus an unlocking from the latch strikers 138, as described herein in more detail. The indicator marking 136 (e.g., a colored patch) is disposed on the pull strap 114 at a predetermined location to indicate when the pull strap 114 is in a position where the seat back 28 is unlatched from latch strikers 138. Thus, a user can quickly visually determine if the seat back 28 is securely latched to the rear wall 30.

Figure 12:
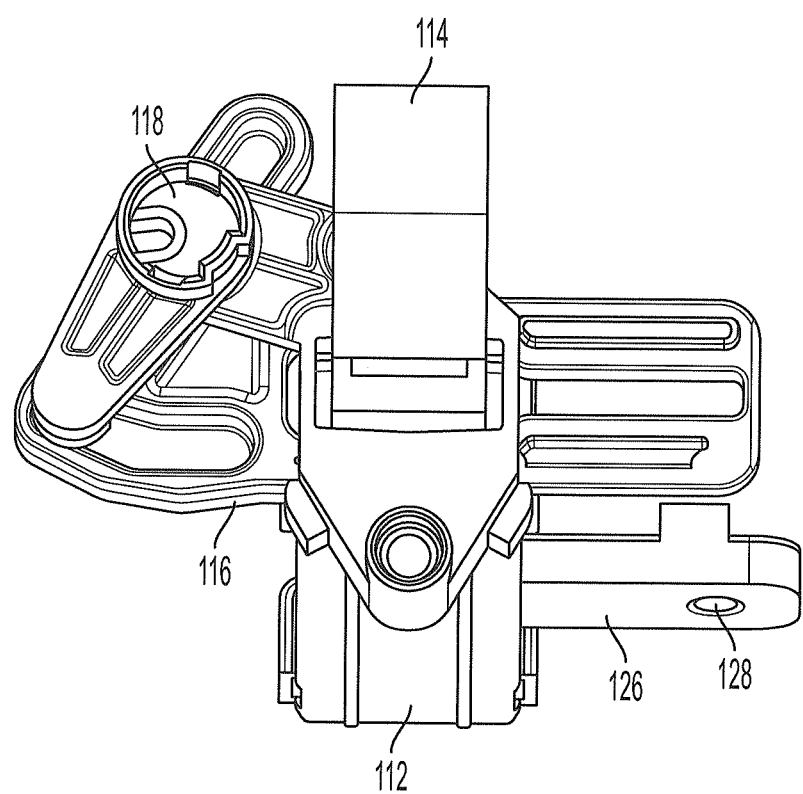
FIG. 12 illustrates one example embodiment of a portion of the seat back locking system shown in FIG. 9, in accordance with the principles of the present disclosure.

As shown in FIGS. 12 and 14, in the example embodiment, the lock slider 116 and lock arm 118 are configured to selectively lock pull strap 114 within pull strap housing 112 to prevent pulling of the pull strap 114. In the example embodiment, lock slider 116 generally includes a lock arm guide portion 140 and a strap guide portion 142. The lock arm guide portion 140 includes a channel 144 configured to receive and guide a pin 146 of the lock arm 118 therealong. The strap guide portion 142 includes a pair of arms 148 extending from lock arm guide portion 140. The arms 148 define a narrow gap 150 and a wider gap 152. When the pull strap 114 is disposed in the narrow gap 150, the arms 148 prevent the locking barrel 134 from passing therethrough, and thus prevent a pulling of the pull strap 114 to unlatch the seat back 28 from the rear wall 30. When the pull strap 114 is disposed in the wider gap 152, the arms 148 allow the locking barrel 134 to pass therethrough, enabling pulling of the pull strap 114 to unlatch the seat back 28 from the rear wall 30.

With additional reference to FIG. 15, in the example embodiment, the lock arm 118 generally includes a central body 160 and an arm 162 extending therefrom. The arm 162 includes at its distal end the pin 146, which is slidingly received in the lock slider channel 144. The central body 160 is configured to interface with a lock and tumbler (not shown), which may be advantageously keyed to the vehicle keys such that seat back locking systems 100 do not require a separate key. Rotation of the lock and tumbler causes rotation of the central body 160, which causes lock arm pin 146 to slide along lock slider channel 144. This movement causes the lock slider 116 to translate in a general cross-car direction relative to the pull strap housing 112 between a locked position (where pull strap 114 is positioned in the narrow gap 150) and an unlocked position (where pull strap 114 is positioned in the wider gap 152).

With further reference to FIG. 10, in the example embodiment, cable system 120 generally includes first and second Bowden cables 164, 166 and a ratio box 168. The first Bowden cable 164 is coupled between the pull strap 114 and the ratio box 168, and the second Bowden cable 166 is coupled between the ratio box 168 output and a seat latch 190 for selectively latching to latch striker 138.

Figure 11:
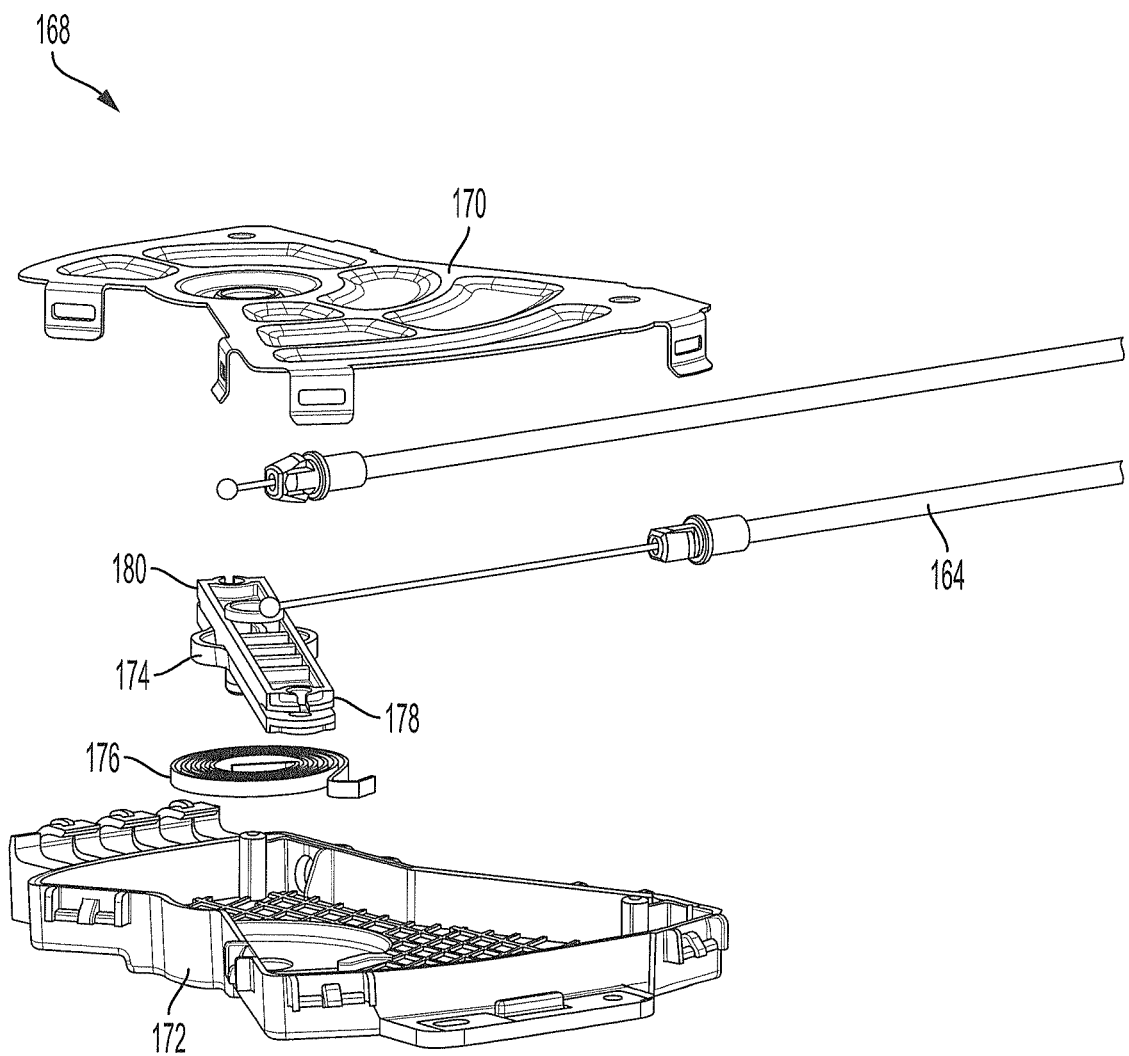
FIG. 11 is an exploded view of an example ratio box of the seat back locking system shown in FIG. 10, in accordance with the principles of the present disclosure.

With further reference to FIG. 11, the ratio box 168 provides a ratio between the amount of effort and resulting force. In one example, ratio box 168 is a 2:1 ratio. As such, pulling the pull strap 114 a first distance results in pulling the seat latch half the first distance but with twice the force. In the illustrated example, the ratio box 168 includes an upper housing 170, a lower housing 172, a transfer lever 174, and a return biasing mechanism 176 (e.g., a clock spring). The upper and lower housings 170, 172 are configured to couple to each other to house the transfer lever 174 and biasing mechanism 176, we well as to define one or more apertures to receive Bowden cables 164, 166. The transfer lever 174 is rotatably coupled to housing 170 and/or 172 and includes a first end 178 and an opposite second end 180. The first end 178 is configured to couple to one end of the first Bowden cable 164, and the second end 180 is configured to couple to one end of the second Bowden cable 166. The return biasing mechanism 176 is configured to pull the pull strap 114 back into the seat 24 when the seat is relatched to strikers 138. It will be appreciated, however, that system 100 may not include a ratio box, or ratio box 168 may have various other configurations that enable cable system 120 to function as described herein.

In one example operation, the seat back locking system 100 begins in the locked position with the seat back 28 latched to the rear wall 30. In this position, the lock arm 118 interacts with the lock slider 116 to locate the lock slider in the locked position with the pull strap 114 disposed within the narrow gap 150. As such, the locking barrel 134 is disposed below the arms 148 and pulling of the pull strap 114 causes the locking barrel 134 to engage the lock slider 116, thereby preventing pulling of the pull strap 114 and subsequent unlatching of the seat back 28 from the rear wall 30. In this way, items stored in the storage compartment 102 between the seat 24 and rear wall 30 are secured and inaccessible without a key.

When the key is used to unlock the seat back locking system 100, the lock and tumbler are rotated, thereby causing rotation of the lock arm 118. This causes lock arm pin 146 to translate along channel 144, which translates the lock slider 116 into the unlocked position where the pull strap 114 is disposed within the wider gap 152. As such, when pull strap 114 is pulled, locking barrel 134 passes through the wider gap 152, which pulls the first Bowden cable 164. This motion is transferred through ratio box 168 to the second Bowden cable 166 to release the seat latch from the latch striker 138. In this way, the storage compartment 102 can now be accessed.

In additional embodiments, a seat locking system similar to system 100 can be incorporated into one or more seat bottoms 26 to require a vehicle key to rotate the seat bottoms 26 upward into the storage access position to allow access to the underseat storage system 40. In other embodiments, seat locking system 100 is configured to unlatch seat bottom 26 in addition to or at the same time as unlatching seat back 28.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle having a rear seat storage arrangement, the vehicle comprising:
   a floor;
   a seat including a seat bottom rotatably coupled to a seat back; and
   an underseat storage system removably coupled to the floor below the seat bottom, the underseat storage system including a storage bin and a lockable lid defining an interior storage compartment,
   wherein when the seat bottom is rotated upward into a storage access position, access is provided to the underseat storage system, and when the seat bottom is rotated downward from the storage access position into a seating position, access to the underseat storage system is prevented, and
   wherein the lockable lid includes a latch configured to selectively lock to prevent access to the interior storage compartment and thereby facilitate preventing access for removably uncoupling the underseat storage system from the floor of the vehicle,
   wherein the lockable lid latch is keyed to a key of the vehicle configured to unlock one or more doors of the vehicle and/or start an ignition of the vehicle.

2. The vehicle of claim 1, wherein the underseat storage system is removably coupled to the vehicle floor such that the underseat storage system can be selectively removed from the vehicle and utilized as a portable storage device.

3. The vehicle of claim 2, wherein the underseat storage system is removably coupled to the vehicle floor with a plurality of fasteners.

4. The vehicle of claim 3, wherein the floor defines a footprint sized and shaped to receive and locate the underseat storage system within the vehicle such that a first plurality of apertures formed in a bottom of the storage bin substantially align with a second plurality of apertures formed in the floor, wherein the first and second plurality of apertures receive the plurality of fasteners.

5. The vehicle of claim 2, further comprising a carrying handle coupled to the storage bin to facilitate carrying the portable underseat storage system when it is decoupled from the vehicle floor.

6. A vehicle having a rear seat storage arrangement, the vehicle comprising:
   a floor;
   a seat including a seat bottom rotatably coupled to a seat back; and
   an underseat storage system removably coupled to the floor below the seat bottom, the underseat storage system including a storage bin and a lockable lid defining an interior storage compartment,
   wherein when the seat bottom is rotated upward into a storage access position, access is provided to the underseat storage system, and when the seat bottom is rotated downward from the storage access position into a seating position, access to the underseat storage system is prevented, and
   wherein the lockable lid includes a latch configured to selectively lock to prevent access to the interior storage compartment and thereby facilitate preventing access for removably uncoupling the underseat storage system from the floor of the vehicle,
   wherein the lockable lid latch comprises coupled pawls configured to move together.

7. The vehicle of claim 6, wherein the pawls each include an arm having a distal end configured to be received within a latch receptacle formed in a front wall of the storage bin.

8. The vehicle of claim 1, wherein the lid comprises a first lid and a second lid rotatably coupled to the storage bin.

9. The vehicle of claim 8, wherein the underseat storage system further comprises a plurality of locating tabs formed on an inner surface of the storage bin, the plurality of locating tabs configured to removably receive a divider therein such that a user can customize a number and size of smaller storage compartments defined within the storage bin.

10. The vehicle of claim 8, wherein the underseat storage system further comprises a split bridge removably received within recesses formed in front and rear walls of the storage bin, the split bridge configured to cover a space between the first and second lids.

11. The vehicle of claim 10, wherein the split bridge comprises a structural rib disposed between a pair of channels, the pair of channels angled and configured to direct liquid behind the storage bin and prevent liquid from entering the storage compartment.

12. The vehicle of claim 8, wherein the vehicle seat is a 60/40 split seat, and the first and second lids are a 60/40 split corresponding to the 60/40 split seat.

13. A vehicle having a rear seat storage arrangement, the vehicle comprising:
    a floor;
    a rear wall;
    a seat including a seat bottom rotatably coupled to a seat back, the seat back selectively latchable to the rear wall and movable between a seating position where the seat back is latched to the rear wall, and a folded seat position where the seat back is rotated downward onto the seat bottom;
    a storage compartment defined behind the seat back between the floor, the rear wall, and the seat back, the storage compartment including a cross-car storage bin; and
    a seat back locking system integrated into the seat and movable from a locked position that prevents unlatching of an upper end of the seat back from the rear wall, and an unlocked position that enables unlatching of the seat back from the rear wall;
    wherein in the locked position, the seat back locking system prevents unlatching of the seat back from the rear wall to thereby prevent access to the storage compartment.

14. The vehicle of claim 13, wherein the seat back locking system includes a main housing, a pull strap housing, a pull strap, a lock slider, a lock arm, and a cable system.

15. The vehicle of claim 13, wherein the storage compartment includes illuminating lights, one or more nets to provide additional storage space, and the cross-car storage bin.

16. The vehicle of claim 13, further comprising:
    an underseat storage system removably coupled to the floor below the seat bottom, the underseat storage system including a storage bin and a lockable lid defining a second storage compartment;
    wherein when the seat bottom is rotated upward into a storage access position, access is provided to the underseat storage system, and when the seat bottom is rotated downward from the storage access position into a seating position, access to the underseat storage system is prevented.

17. The vehicle of claim 16, wherein in the locked position, the seat back locking system prevents rotation of the seat bottom from the seated position to the storage access position to facilitate preventing access to the underseat storage system and the first second storage compartment.

* * * * *